(12) United States Patent
Lee

(10) Patent No.: US 6,367,829 B1
(45) Date of Patent: Apr. 9, 2002

(54) FOLDING COLLAPSIBLE KICK SCOOTER

(75) Inventor: Guang-Gwo Lee, Taipei (TW)

(73) Assignee: Playmaker Co., Ltd. (TW)

( * ) Notice: Subject to any disclaimer, the term of this patent is extended or adjusted under 35 U.S.C. 154(b) by 0 days.

(21) Appl. No.: 09/722,709

(22) Filed: Nov. 28, 2000

(51) Int. Cl.[7] .................................................. B62M 1/00
(52) U.S. Cl. ............................... 280/87.05; 280/87.041
(58) Field of Search ....................... 280/87.01, 87.021, 280/87.03, 87.041, 87.042, 87.043, 87.05; 403/321, 322.1, 322.3, 325

(56) References Cited

U.S. PATENT DOCUMENTS

| | | | | |
|---|---|---|---|---|
| 6,173,976 B1 | * | 1/2001 | Lee ......................... | 280/87.05 |
| 6,182,988 B1 | * | 2/2001 | Wu ......................... | 280/87.05 |
| 6,206,387 B1 | * | 3/2001 | Tsai ......................... | 280/87.05 |
| 6,234,501 B1 | * | 5/2001 | Chen ......................... | 280/87.05 |
| 6,260,866 B1 | * | 7/2001 | Cheng ..................... | 280/87.05 |
| 6,270,095 B1 | * | 8/2001 | Chang ..................... | 280/87.05 |
| 6,270,097 B1 | * | 8/2001 | Lin ......................... | 280/87.05 |
| 6,276,701 B1 | * | 8/2001 | Chen ......................... | 280/87.05 |
| 6,283,485 B1 | * | 9/2001 | Tsai ......................... | 280/87.05 |
| 6,286,845 B1 | * | 9/2001 | Lin ......................... | 280/87.05 |

\* cited by examiner

*Primary Examiner*—Lanna Mai
*Assistant Examiner*—Jeff Restifo
(74) *Attorney, Agent, or Firm*—Donald C. Casey, Esq.

(57) ABSTRACT

A folding collapsible kick scooter includes a footplate, a head tube collapsibly coupled to the front side of the footplate by a joint and lock unit, a stem moved in and out of the head tube and releasably locked in position by a quick-release lock, a handlebar connector mounted on the top end of the stem to hold two handlebars, a press control lock installed in the handlebar connector and adapted to lock the handlebars between two positions, a front wheel holder fixedly fastened to the bottom end of the head tube and holding a front wheel on a front suspension arm thereof, a rear wheel holder fixedly fastened to the rear side of the footplate and holding a rear wheel on a rear suspension arm thereof, and a rear fender pivoted to the rear wheel holder and supported on spring means and served as a foot brake for stopping the rear wheel from rotation.

6 Claims, 9 Drawing Sheets

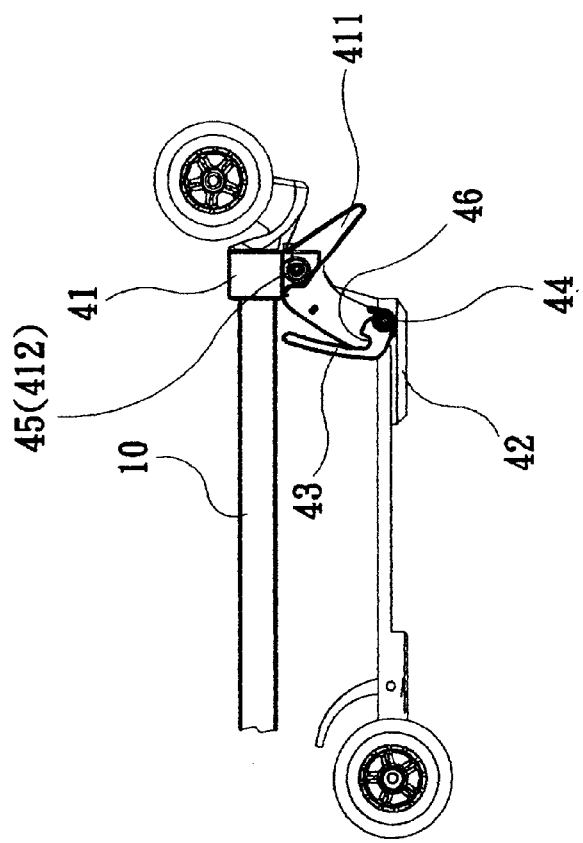
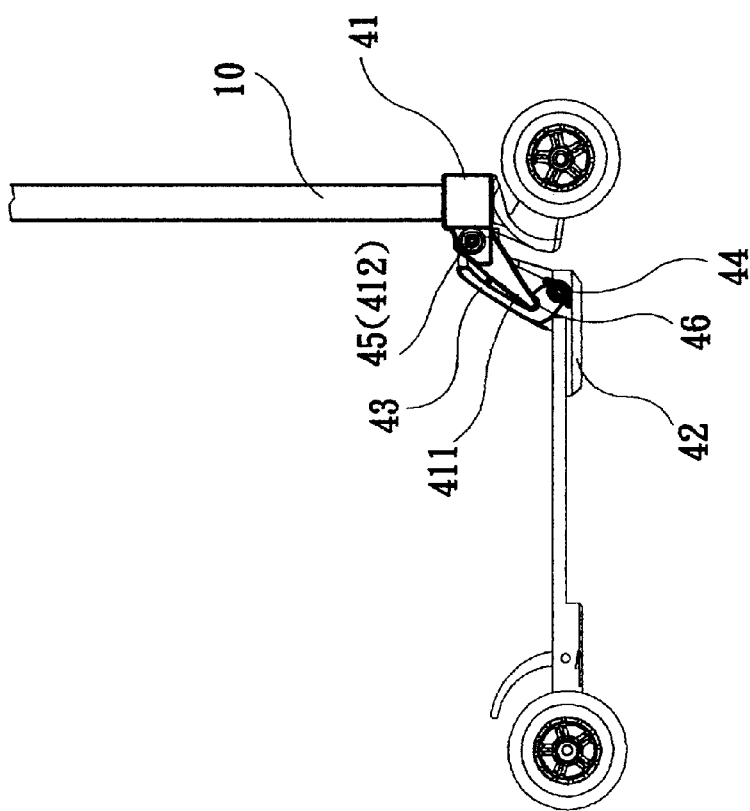
FIG. 6(A)
FIG. 6(B)

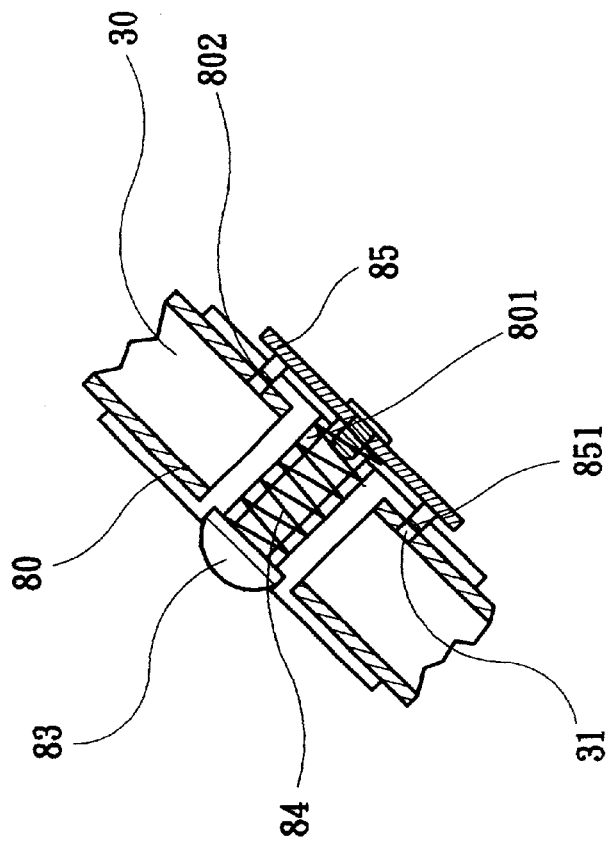
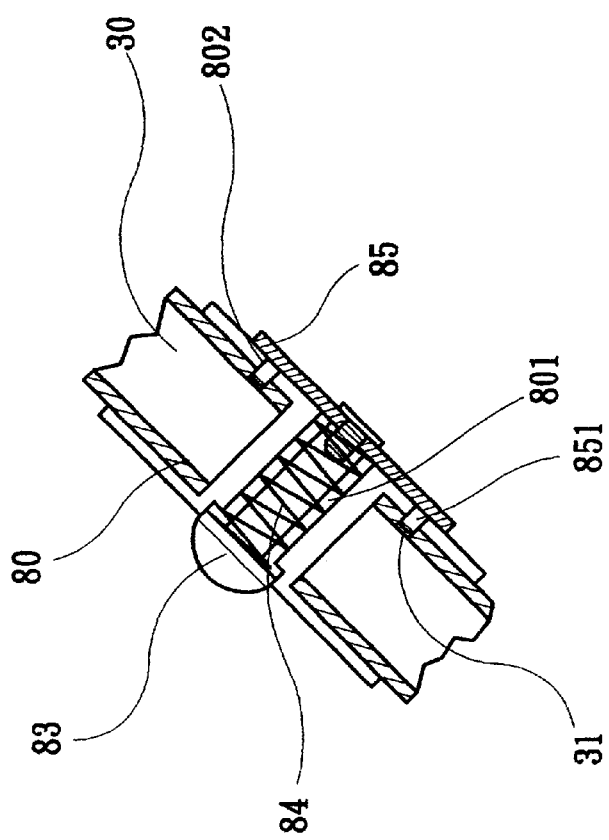
FIG. 7(A)
FIG. 7(B)

FOLDING COLLAPSIBLE KICK SCOOTER

BACKGROUND OF THE INVENTION

The present invention relates to kick scooters and, more particularly, to a folding collapsible kick scooter, which can be conveniently carried by hand when collapsed.

In early days, kick scooters were heavy and not collapsible. Nowadays, commercially available kick scooters are compact and folding collapsible. FIG. 1A shows a folding collapsible kick scooter according to the prior art. According to this structure of folding collapsible kick scooter, the head frame A can be turned from the operative position shown in FIG. 1A to the non-operative position shown in FIG. 1B. When collapsing the kick scooter, the quick-release lock is unlocked, and then the head frame A (which is coupled to the front coupling frame D by a slip joint) is pulled downwards relative to the front coupling frame D of the footplate B to disengage the locating rod C from the retaining notch E, and then the head frame A is turned with the handlebar and front wheel assembly G about the pivot F at the front coupling frame D from the vertical position shown in FIG. 1A the horizontal position shown in FIG. 1B. This structure of folding collapsible kick scooter is still not satisfactory in function. The drawbacks of this folding collapsible kick scooter are outlined hereinafter.

1. When collapsing the kick scooter, the user's hands tend to be injured by the protruded parts of the kick scooter.
2. Because the handlebar and front wheel assembly is disposed in contact with the inside wall of the head frame, the coating of the stem of the handlebar and front wheel assembly tends to be damaged when adjusting the elevation of the handlebar.
3. Because the handlebar of the handlebar and front wheel assembly is a straight bar not orthopedically engineered, it is not comfortable in use, and the rider tends to be injured by the handlebar accidentally.

SUMMARY OF THE INVENTION

The present invention has been accomplished to provide a folding collapsible kick scooter, which eliminates the aforesaid drawbacks. According to one aspect of the present invention, the folding collapsible kick scooter comprises a footplate, a head tube collapsibly coupled to the front side of the footplate by a joint and lock unit, a stem moved in and out of the head tube and releasably locked in position by a quick-release lock, a handlebar connector mounted on the top end of the stem to hold two handlebars, a press control lock installed in the handlebar connector and adapted to lock the handlebars between two positions, a front wheel holder fixedly fastened to the bottom end of the head tube and holding a front wheel on a front suspension arm thereof, a rear wheel holder fixedly fastened to the rear side of the footplate and holding a rear wheel on a rear suspension arm thereof, and a rear fender pivoted to the rear wheel holder and supported on spring means and served as a foot brake for stopping the rear well from rotation. According to another aspect of the present invention, a flexible bush is mounted in the top end of the head tube to guide movement of the stem, and to prevent direct contact of the stem with the inside wall of the head tube. According to still another present aspect of the present invention, the handlebars are curved rod members orthopedically engineered. According to still another aspect of the present invention, the front wheel holder comprises a front suspension arm, which supports the front wheel, and the rear wheel holder comprises a rear suspension arm, which supports the rear wheel.

BRIEF DESCRIPTION OF THE DRAWINGS

FIG. 6A is a side view of a part of the present invention, showing the head tube disposed in the vertical (operative) position according to the present invention.

FIG. 6B is a side view of a part of the present invention showing the head tube turned to the horizontal (non-operative) position.

FIG. 7A is a sectional view in an enlarged scale of a part of the present invention, showing the short locating rods of the locating plate engaged into the positioning holes of the handlebars.

FIG. 7B is similar to FIG. 7A but showing the short locating rods of the locating plate disengaged from the positioning holes of the handlebars.

DETAILED DESCRIPTION OF THE PREFERRED EMBODIMENT

Figure 1B:
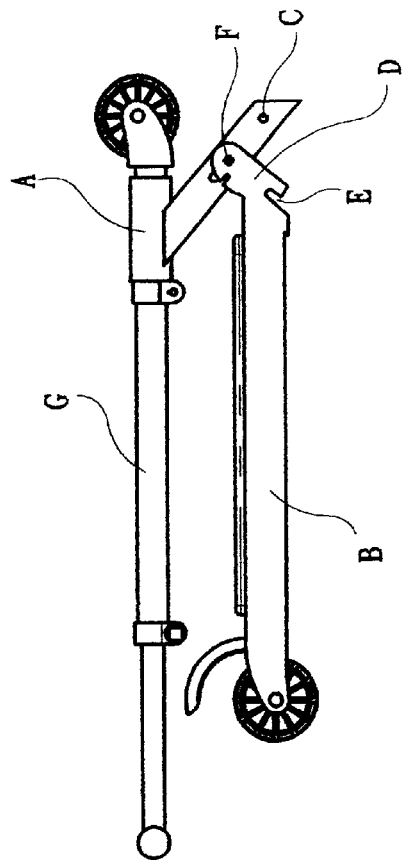
FIG. 1B illustrates the prior art folding collapsible kick scooter collapsed.
Figure 1A:
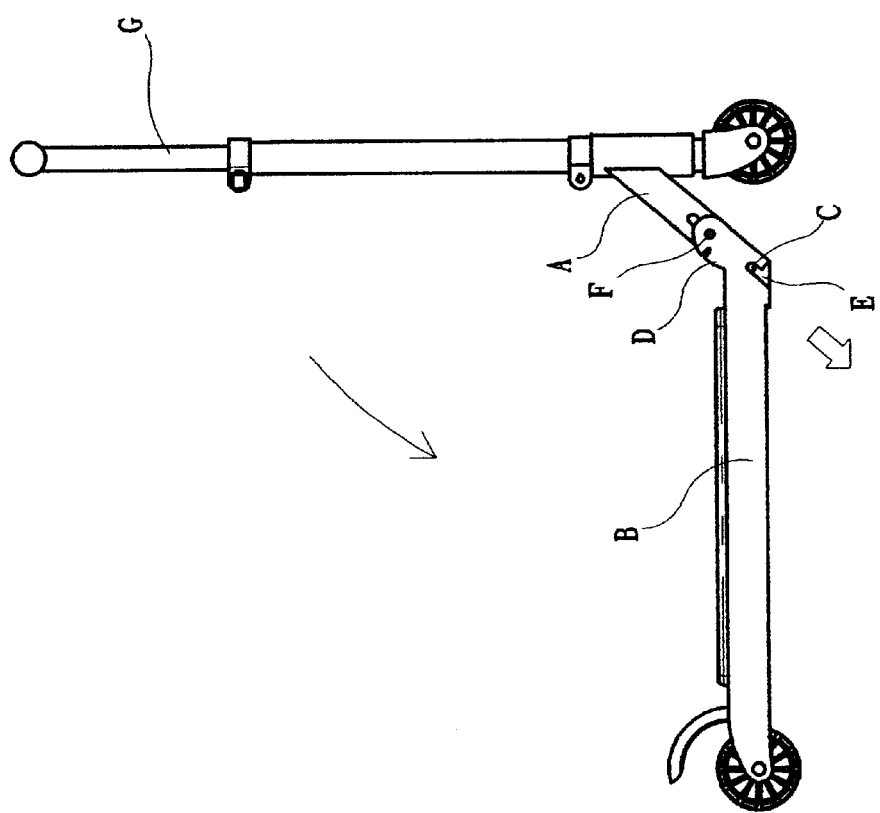
FIG. 1A is a side view of a folding collapsible kick scooter according to the prior art.
Figure 2:
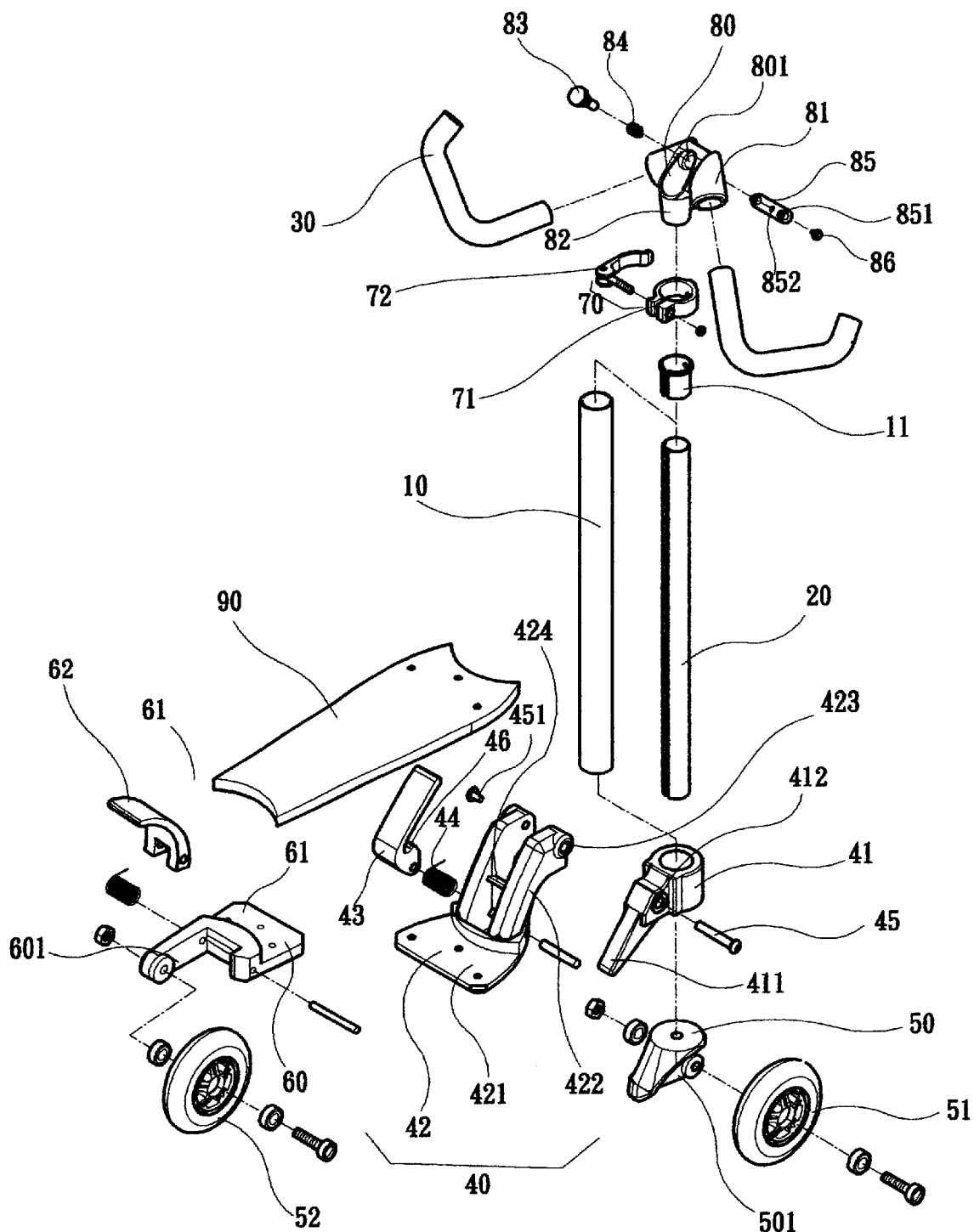
FIG. 2 is an exploded view of a folding collapsible kick scooter according to the present invention.
Figure 3:
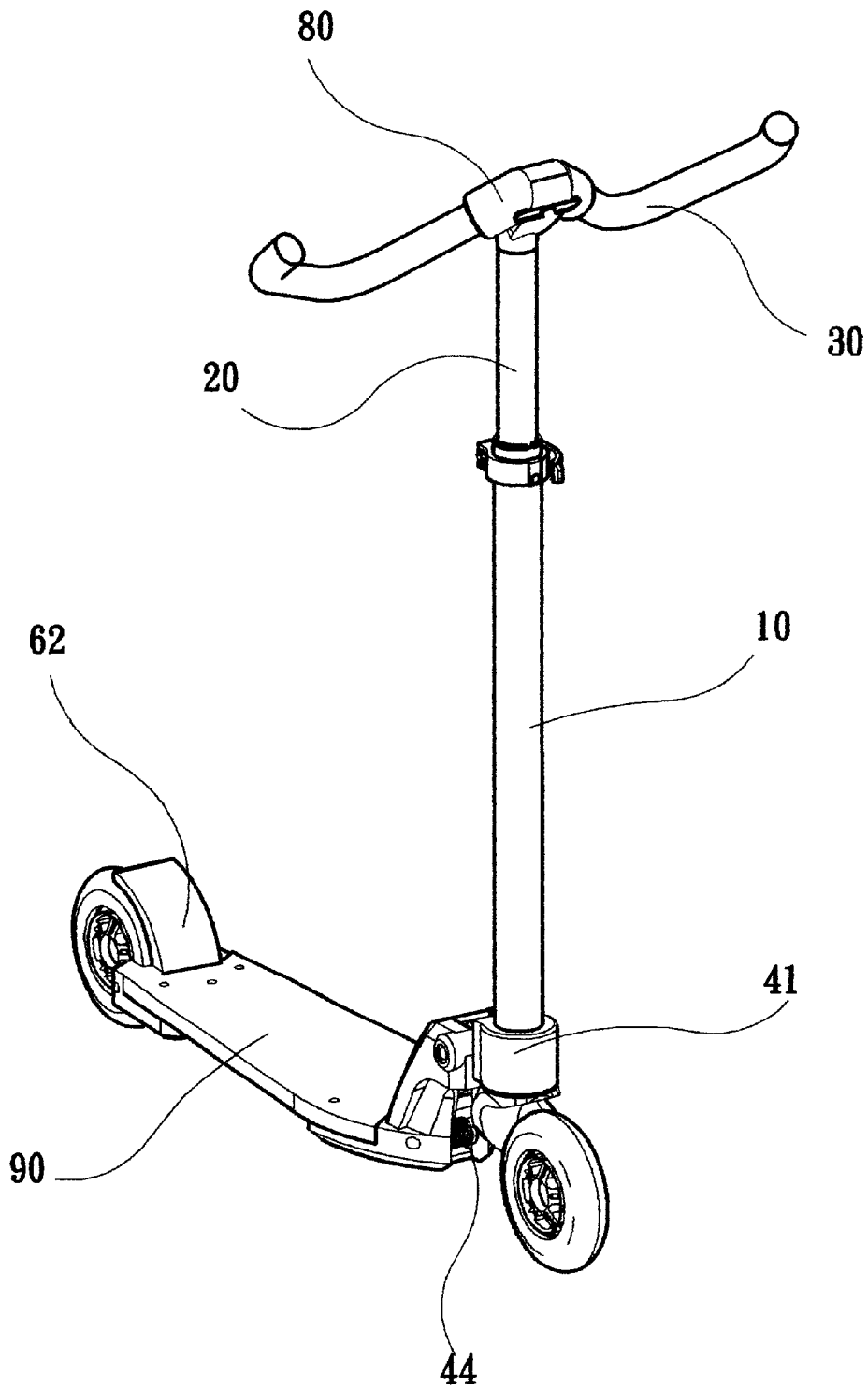
FIG. 3 is an oblique front elevation of the following collapsible kick scooter according to the present invention.
Figure 4:
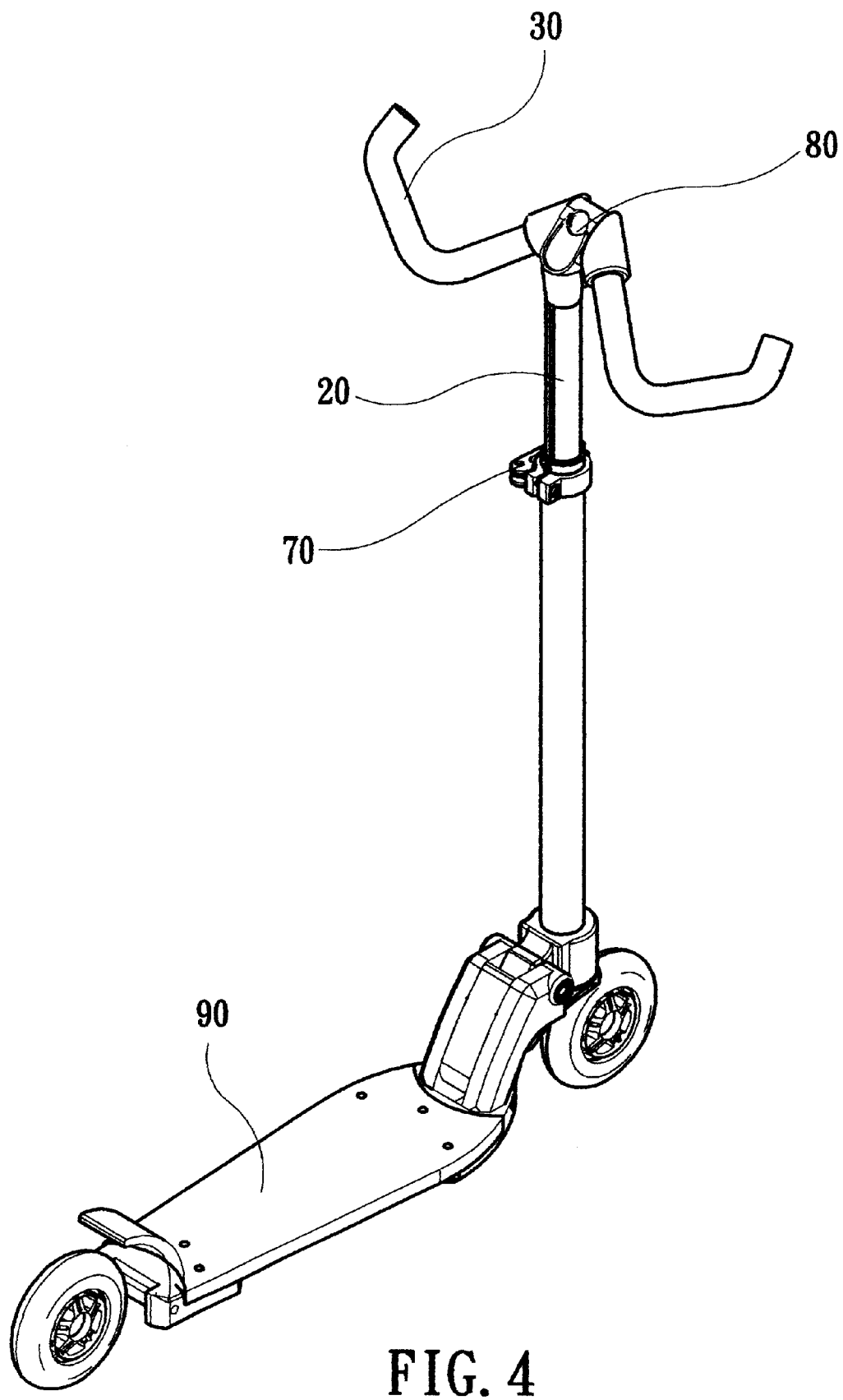
FIG. 4 is an oblique rear elevation view of the folding collapsible kick scooter according to the present invention.

Referring to FIGS. from 2 through 5, a folding collapsible kick scooter in accordance with the present invention is generally comprised of a head tube 10, a stem 20, a pair of handlebars 30, a joint and lock unit 40, a front wheel holder 50, a front wheel 51, a rear wheel holder 60, a rear wheel 52, a rear fender 62, a quick-release lock 70, a handlebar connector 80, and a footplate 90.

The head tube 10 is a round tube connected with its bottom end to the joint and lock unit 40. The top end of the head tube 10 is mounted with a flexible bush 11, which prevents direct friction between the inside wall of the head tube 10 and the stem 20. The stem 20 is a round rod inserted through the flexible bush 11 in the head tube 10, having a top end connected to the handlebar connector 80. The handlebars 30 are curved rod members respectively connected to the handlebar connector 80 at two sides, each having a positioning hole 31 at one end (see FIGS. 7A and 7B). The joint and lock unit 40 comprises a constraint member 41, a connecting frame 42, a locking lever 43, and a torsional spring 44. The constraint member 41 is sleeved onto the bottom end of the head tube 10, having a stop rod 411 extended from the periphery and a through hole 412 transversely extended through the stop rod 411. The connecting frame 42 comprises a flat mounting plate 421 fixedly fastened to the front side of the footplate 90 by screws, two parallel arms 422 obliquely forwardly extended from the flat mounting plate 421, and a transverse rod 424 connected between the arms 422. The arms 422 each have a pivot hole 423 near the distal end respectively pivotally connected to the through hole 412 of the stop rod 411 of the constraint member 41 by a pivot bolt 45 and an end piece 451. The locking lever 43 is pivoted to the connecting frame 42 by pivot means, having a retaining notch 46. The torsional spring 44 is mounted on the pivot means about which the locking lever 43 is turned and connected between the connecting frame 42 and the locking lever 43. The front wheel holder 50 is fastened to the bottom end of the head tube 10, having a front suspension arm 501 (see FIG. 5). The front wheel 51 is mounted on the suspension arm 501 of the front wheel holder 50. The rear wheel holder 60 comprises a flat mounting plate 61 fixedly fastened to the rear side of the footplate 90 by screws, and a rear suspension arm 601. The rear wheel 52 is mounted on the rear suspension arm 601 of the rear wheel holder 61. The rear fender 62 is pivoted to the rear wheel holder 60 around a part of the rear wheel 52, and supported on a spring (not shown), which keeps the rear fender 62 away from the periphery of the rear wheel 52. The rear fender 62 can be pressed on the periphery of the rear wheel 52 with the foot to stop the rear wheel 52 from rotation. The quick-release lock 70 is comprised of a clamping ring 71 mounted on the top end of the head tube 10, and a locking lever 72 pivoted to the clamping ring 71 and controlled to lock the stem 20 in the head tube 10 at the desired elevation. The handlebar connector 80 comprises two side coupling tubes 81, which receive the handlebars 30 respectively, a bottom coupling tube 82, which receives the top end of the stem 20, a center through hole 801, two bottom holes 802 equally spaced from the center through hole 801 at two sides, and a press-control lock installed in the center through hole 801. the press-control lock is comprised of a press button 83, a compression spring 84, and a locating plate 85. The press button 83 is a headed female screw mounted in the center through hole 801 of the handlebar connector 80. The locating plate 85 is connected to the bottom end of the press button 83 outside the handlebar connector 80, comprising a center through hole 852, and two short locating rods 851 respectively engaged into the bottom holes 802 of the handlebar connector 80. The compression springs 83 is sleeved onto the press button 80 in the center through hole 801 of the handlebar connector 80, and stopped between the head of the press button 83 and the locating plate 85. A screw 86 is mounted in the center through hole 852 of the locating plate 85 and threaded into the inner thread of the press button 80 to secure the locating plate 85 to the press button 83.

Referring to FIGS. 6A and 6B, the torsional spring 44 holds the locking lever 43 in the locking position where the stop rod 411 of the constraint member 41 is maintained engaged into the retaining notch 46 of the locking lever 43. When turning the locking lever 43 from the locking position to the unlocking position, the stop rod 411 is disengaged from the retaining notch 46, enabling the head tube 10 to be turned with the constraint member 41 from the vertical (operative) position shown in FIG. 6A to the horizontal (non-operative) position shown in FIG. 6B. On the contrary, when turning the head tube 10 from the horizontal position to the vertical position, the stop rod 411 is moved into engagement with the retaining notch 46 of the locking lever 43 again, and therefore the head tube 10 is locked in the vertical (operative) position.

Figure 9:
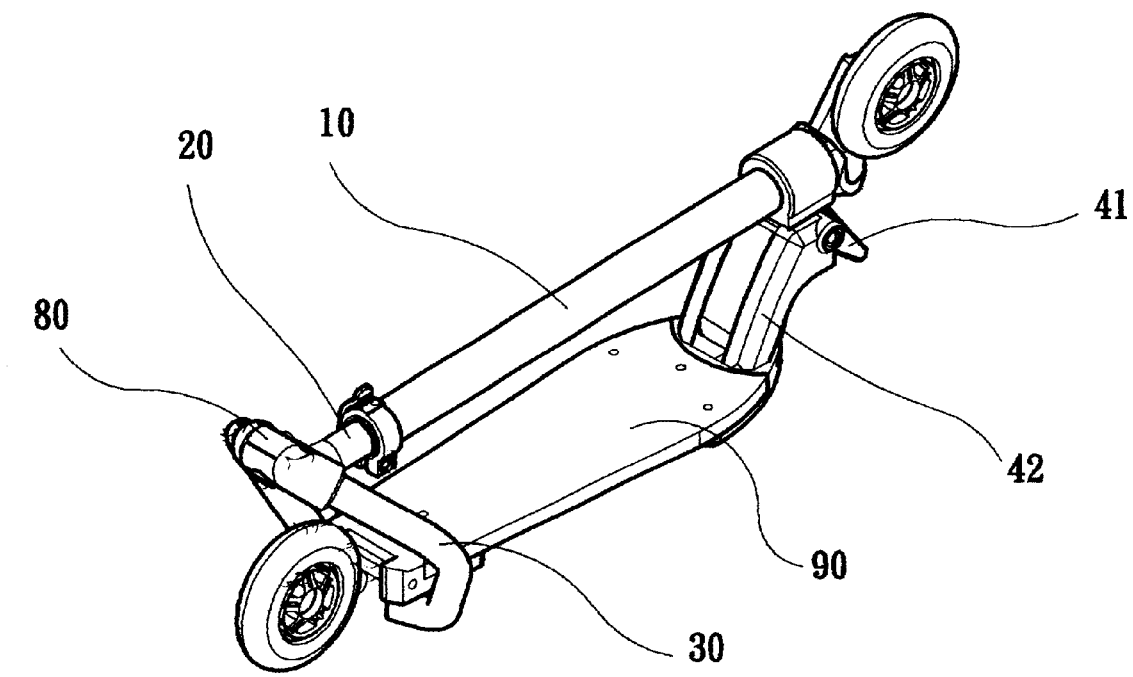
FIG. 9 illustrates the folding collapsible kick scooter collapsed according to the present invention.

Referring to FIGS. 7A, 7B, and 9, after the head tube 10 has been turned to the horizontal position and closely attached to the footplate 90, the press button 83 is depressed to force the short locating rods 851 of the locating plate 85 out of the bottom holes 802, for enabling the handlebars 30 to be respectively rotated in the side coupling tubes 81 of the handlebar connector 80 and hooked on the footplate 90. Thus, the collapsed kick scooter can be conveniently carried by hand. When in use, the handlebars 30 are respectively rotated in the side coupling tubes 81 of the handlebar connector 80 in the reversed direction to such position that the positioning holes 31 of the handlebars 30 are respectively aimed at the bottom holes 802, for enabling the short locating rods 851 to be respectively engaged into the bottom holes 802 and the positioning holes 802 to lock the handlebars 30 in the operative position. Thereafter, the head tube 10 is turned from the horizontal position to the vertical position again.

Figure 8:
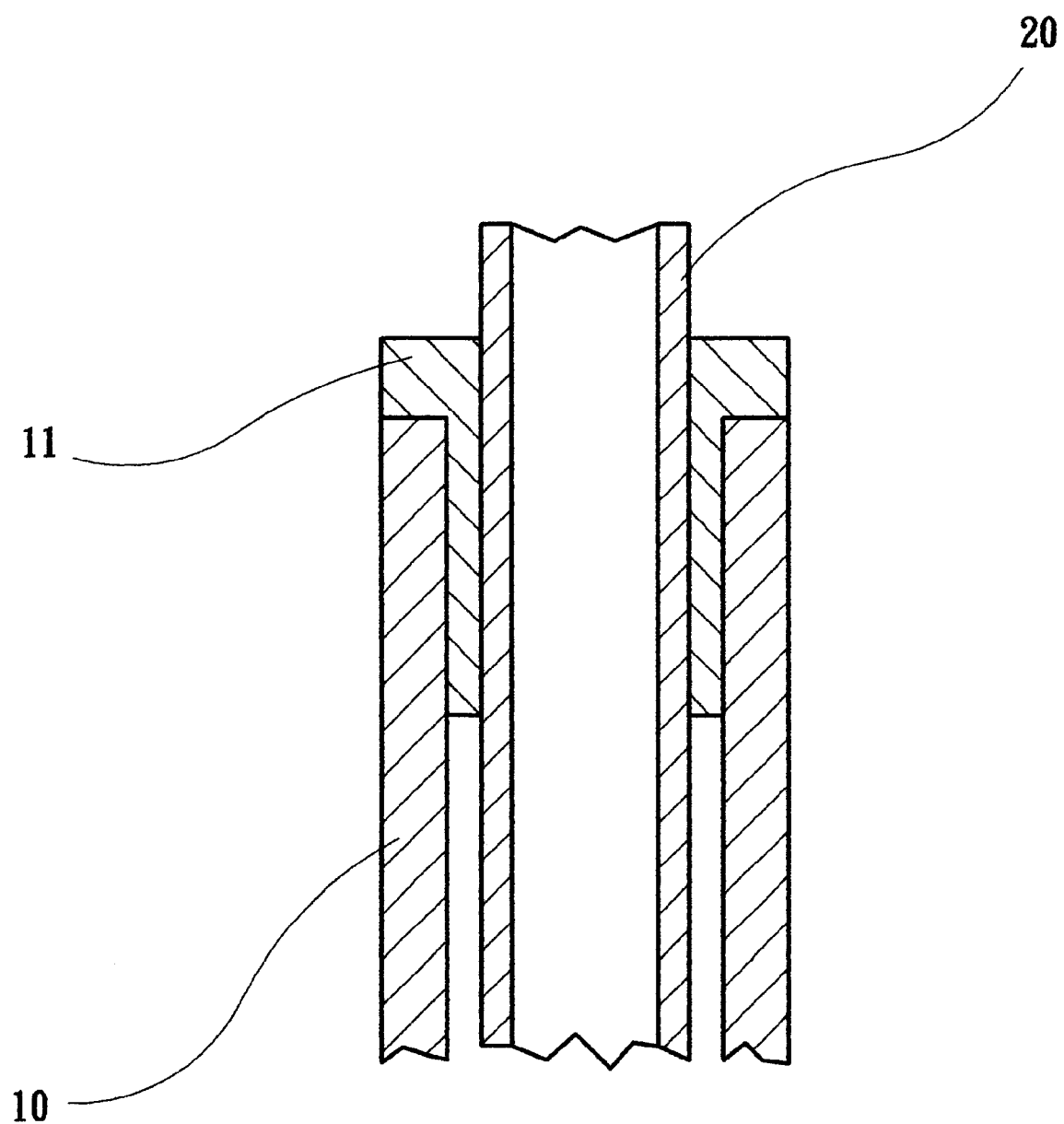
FIG. 8 is a sectional view in an enlarged scale of a part of the present invention, showing the flexible bush mounted in the top end of the head tube, the stem inserted through the flexible bush.

Referring to FIG. 8, the flexible bush 11 is mounted in the top end of the head tube 10 to prevent direct contact of the stem 20 with the inside wall of the head tube 10. Therefore, frequently moving the stem 20 in and out of the head tube 10 does not cause damage to the coating of the stem 20.

Figure 5:
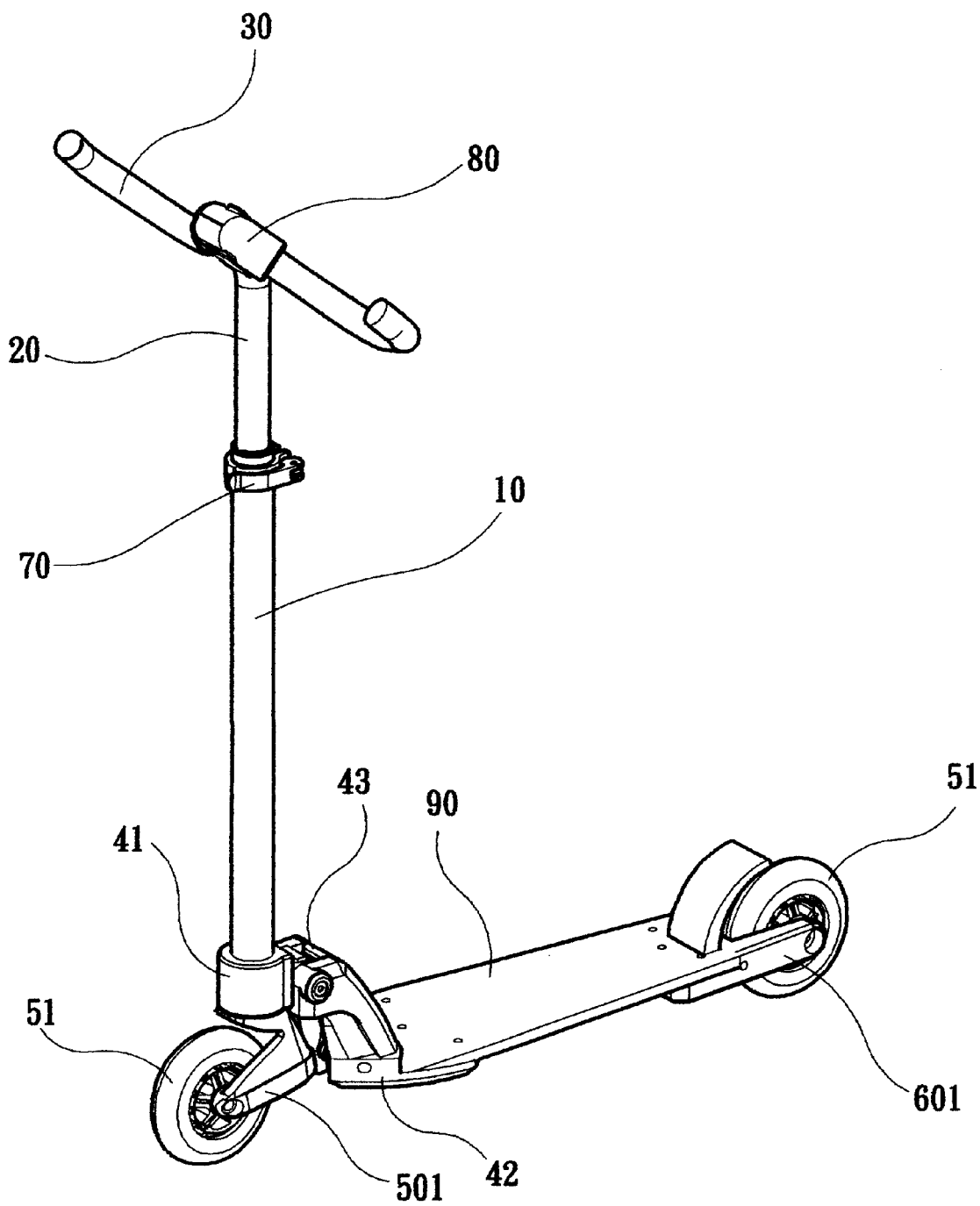
FIG. 5 is an oblique side elevation of the folding collapsible kick scooter according to the present invention.

Referring to FIG. 5, the front wheel 51 and the rear wheel 52 are respectively mounted on the front suspension arm 501 of the front wheel holder 50 and the rear suspension arm 601 of the rear wheel holder 60. This design lessens transmission of shock waves from the wheels 51 and 52 to the footplate 90 when riding the kick scooter over an uneven road surface. Further, this wheel mounting arrangement causes a sense of beauty.

It is to be understood that the drawings are designed for purposes of illustration only, and are not intended for use as a definition of the limits and scope of the invention disclosed.

What the invention claimed is:

1. A folding collapsible kick scooter comprising:
   a footplate, said footplate having a front side and a rear side;
   a rear wheel holder, said rear wheel holder comprising a flat mounting plate fixedly fastened to the rear side of said footplate by screws;
   a rear wheel mounted on said rear wheel holder;
   a spring-supported rear fender pivoted to said rear wheel holder around a part of the periphery of said rear wheel;
   a head tube, said head tube having a top end and a bottom end
   a joint and lock unit coupled between the front side of said footplate and the bottom end of said head tube, said joint and lock unit comprises a constraint member, a connecting frame, a locking lever, and a torsional spring, and connecting frame comprising a flat mounting plate fixedly fastened to the front side of said footplate by screws, two parallel arms obliquely forwardly extended from the flat mounting plate of said connecting frame, and a transverse rod connected between said parallel arms, said constraint member being sleeved onto the bottom end of said head tube and having a stop rod extended from the periphery thereof and a through hole transversely extended through said stop rod and pivotally connected between said parallel arms by pivot means, the locking lever of said joint and lock unit being pivoted to said connecting frame and having a retaining notch adapted to receive said stop rod to stop said constraint member and said head tube in position, said torsional spring being mounted on the pivot means about which the locking lever of said joint and lock unit is turned and connected between said connecting frame and the locking lever of said joint and lock unit to hold the locking lever of said joint and lock unit in an engaged position with said stop rod of said constraint member;

a stem moved in and out of the top end of said head tube, said stem having a top end disposed outside said head tube;

a quick-release lock mounted on the top end of said head tube and controlled to lock said stem in said head tube, said quick-release lock comprised of a clamping ring mounted on the top end of said head tube, and a locking lever pivoted to said clamping ring and controlled to lock said stem in said head tube at the desired elevation;

two handlebars;

a handlebar connector connected between said handlebars and the top end of said stem, said handlebar connector comprising two side coupling tubes disposed at two sides, which receive said handlebars respectively, a bottom coupling tube, which receives the top end of said stem;

a press control lock installed in said handlebar connector and adapted to lock said handlebars in the side coupling tubes of said handlebar connector;

a front wheel holder fixedly fastened to the bottom end of said head tube below said joint and lock unit; and a front wheel mounted on said front wheel holder.

2. The folding collapsible kick scooter of claim 1 further comprising a flexible bush mounted in the top end of said head tube to guide movement of said stem in said head tube and to stop said stem from direct contact with said heat tube.

3. The folding collapsible kick scooter of claim 1, wherein said front wheel holder comprises a front suspension arm on which said front wheel is mounted.

4. The folding collapsible kick scooter of claim 1, wherein said rear wheel holder comprises a rear suspension arm on which said rear wheel is mounted.

5. The folding collapsible kick scooter of claim 1, wherein said handlebars are curved rod members.

6. The folding collapsible kick scooter of claim 1, wherein said handlebar connector comprises a center through hole, and two bottom holes; said handlebars each comprise a positioning hole corresponding to said bottom holes; said press control lock comprises a headed press button mounted in the center through hole of said handlebar connector, a locating plate fixedly fastened to a bottom end of said headed press button outside said handlebar connector, said locating plate comprising two short locating rods respectively engaged into the bottom holes of said handlebar connector and the positioning holes of said handlebars, and a compression spring mounted on said heated press button in the handlebar connector and stopped between the head of said headed press button and said locating plate.

* * * * *